(12) United States Patent
Jiang

(10) Patent No.: US 6,320,619 B1
(45) Date of Patent: Nov. 20, 2001

(54) FLICKER FILTER CIRCUIT

(75) Inventor: Hong Jiang, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/988,794

(22) Filed: Dec. 11, 1997

(51) Int. Cl.$^7$ ................................................. H04N 11/20
(52) U.S. Cl. ........................ 348/447; 708/301; 708/319; 348/910; 382/260
(58) Field of Search ................................. 328/447, 910, 328/443, 444, 459, 457, 454, 446, 581, 453, 4; 345/154; 382/262, 264, 266, 260; 708/301, 315, 316, 319, 320, 444, 445; H04N 11/20

(56) References Cited

U.S. PATENT DOCUMENTS

| | | | | |
|---|---|---|---|---|
| 4,709,343 | * | 11/1987 | Van Cang | 708/343 |
| 5,455,628 | * | 10/1995 | Bishop | 348/446 |
| 5,742,349 | * | 4/1998 | Choi et al. | 348/443 |
| 5,990,965 | * | 11/1999 | Herz et al. | 348/447 |
| 6,061,094 | * | 5/2000 | Maietta | 348/447 |

* cited by examiner

*Primary Examiner*—Michael Lee
(74) *Attorney, Agent, or Firm*—Howard A. Skaist

(57) ABSTRACT

Briefly, in accordance with one embodiment of the invention, an integrated circuit includes: a flicker filter circuit. The flicker filter circuit has a configuration so that during filter operation two line buffers are employed to store partial sums of the filtered input digital signal samples.

Briefly, in accordance with another embodiment of the invention, an integrated circuit includes: three line buffers, three multipliers, and three adders. The buffers, multipliers and adders are coupled in a circuit configuration so as to implement a flicker filter during circuit operation.

17 Claims, 11 Drawing Sheets

$h_1(n) = y(n) = C1 \cdot x(n) + C2 \cdot x(n-1) + C3 \cdot x(n-2)$ $H_1(z) = Y(z) = [C1 + C2 \cdot z^{-1} + C3 \cdot z^{-2}] X(z)$ $h_2(n) = D1,y \cdot y(n) + D2,y \cdot y(n-2)$
$H_2(z) = [D1,y + D2,y \cdot z^{-2}] Y(z)$ Where  $D1,y = 1 - D2,y$
$D2,y = \text{frac}(\Delta \cdot Y + D0)$
$D0$ is the interpolation initial phase
$\Delta$ is the interpolation increment
$Y$ is the line count
$\text{frac}(\bullet)$ is an operation that removes the integer portion and leaves the fractional portion of an operand $H(z) = H_1(z) \cdot H_2(z)$
$= C1 \cdot D1,y + C2 \cdot D1,y \cdot z^{-1} + C1 \cdot z^{-2} + C2 \cdot D2,y \cdot z^{-3} + C1 \cdot D2,y \cdot z^{-3}$

FIG. 2

| Line Clock Pulses | Line 1 [L1(n)] | Line 2 [L2(n)] | FIFO 3 [L3(n)] |
|---|---|---|---|
| 1 | C1*I(1) | C1*I(1) | - |
| 2 | C2*I(2)+L1(1) | L2(1) | - |
| 3 | C1*I(3)+L1(2) | C1*I(3) | D1,y(3)*C2(2)+D2,y(3)*(C1*I(3)+L1(2)) |
| 4 | L1(3) | C2*I(4)+L2(3) | L3(3) (NO UPDATE) |
| 5 | C1*I(5) | C1*I(5)+C2(4) | D1,y(5)*L1(4)+D2,y(5)*(C1*I(5)+L2(4)) |
| 6 | C2*I(6)+L1(5) | L2(5) | L3(5) (NO UPDATE) |
| 7 | C1*I(7)+L1(6) | C1*I(7) | D1,y(7)*L2(5)+D2,y(7)*(C1*I(7)+L1(6)) |
| 8 | L1(7) | C2*I(8)+L2(7) | L3(7) (NO UPDATE) |
| 9 | C1*I(9) | C1*I(9)+C2(8) | D1,y(9)*L1(8)+D2,y(9)*(C1*I(9)+L2(8)) |
| 10 | C2*I(10)+L1(9) | L2(9) | L3(9) (NO UPDATE) |
| 11 | C1*I(11)+L1(10) | C1*I(11) | D1,y(11)*C2(10)+D2,y(11)*(C1*I(11)+L1(10)) |
| 12 | . | . | . |

FIG. 4

$$H(z) = C_1 + C_2 z^{-1} + C_3 z^{-2} \quad \text{WHEN} \quad \Delta = 1 \text{ AND } D_0 = 0, \begin{cases} D_1, y=1 \\ D_2, y=0 \end{cases}$$

$$H(z) = \tfrac{1}{2}C_1 + \tfrac{1}{2}C_2 z^{-1} + C_1 z^{-2} + \tfrac{1}{2}C_2 z^{-3} + \tfrac{1}{2}C_1 z^{-4} \quad \text{WHEN} \quad \Delta = 1 \text{ AND } D_0 = 0.5 \begin{cases} D_1, y=0.5 \\ D_2, y=0.5 \end{cases}$$

FIG. 7

| Y | Δ = 1 | | Δ = 1.2 | | Δ = 1.3 | | Δ = 1.5 | |
|---|---|---|---|---|---|---|---|---|
| | D0,y | D1,y | D0,y | D1,y | D0,y | D1,y | D0,y | D1,y |
| 0 | 1 | 0 | 1 | 0 | 1 | 0 | 1 | 0 |
| 1 | 1 | 0 | 0.8 | 0.2 | 0.7 | 0.3 | 0.5 | 0.5 |
| 2 | 1 | 0 | 0.6 | 0.4 | 0.4 | 0.6 | 1 | 0 |
| 3 | 1 | 0 | 0.4 | 0.6 | 0.1 | 0.9 | 0.5 | 0.5 |
| 4 | 1 | 0 | 0.2 | 0.8 | 0.8 | 0.2 | 1 | 0 |
| 5 | 1 | 0 | 1 | 0 | 0.5 | 0.5 | 0.5 | 0.5 |
| ... | | | | | | | | |

FIG. 8

| Line Clock Pulses | Line 1 [L1(n)] | Line 2 [L2(n)] | FIFO 3 [L3(n)] |
|---|---|---|---|
| 1 | C1*I(1) | C1*I(1) | - |
| 2 | C2*I(2)+L1(1) | ey(2)*L1(1)+L2(1) | - |
| 3 | C1*I(3)+L1(2) | C1*I(3) | D1,y(3)*L2(2)+D2,y(3)*(C1*I(3)+L1(2)) |
| 4 | ey(4)*L2(3)+L1(3) | C2*I(4)+L2(3) | L3(3) (NO UPDATE) |
| 5 | C1*I(5) | C1*I(5)+L2(4) | D1,y(5)*L1(4)+D2,y(5)*(C1*I(5)+L2(4)) |
| 6 | C2*I(6)+L1(5) | ey(6)*L1(5)+L2(5) | L3(5) (NO UPDATE) |
| 7 | C1*I(7)+L1(6) | C1*I(7) | D1,y(7)*L2(6)+D2,y(7)*(C1*I(7)+L1(6)) |
| 8 | ey(8)*L2(7)+L1(7) | C2*I(8)+L2(7) | L3(7) (NO UPDATE) |
| 9 | C1*I(9) | C1*I(9)+L2(8) | D1,y(9)*L1(8)+D2,y(9)*(C1*I(9)+L2(8)) |
| 10 | C2*I(10)+L1(9) | ey(10)*L1(9)+L2(9) | L3(9) (NO UPDATE) |
| 11 | C1*I(11)+L1(10) | C1*I(11) | D1,y(11)*L2(10)+D2,y(11)*(C1*I(11)+L1(10)) |
| 12 | . | . | . |

FIG. 10

FLICKER FILTER CIRCUIT

BACKGROUND

1. Field

The present invention relates to displaying personal computer (PC) graphics on a television (TV) screen and, more particularly, to a flicker filter circuit for filtering the PC signals.

2. Background Information

Displaying personal computer (PC) graphics content on a television (TV) screen is desirable to enable multimedia PCs to become a common feature in most households as an entertainment appliance. To generate TV signals with acceptable quality, it is desirable to employ a flicker filter and also overscan compensation to convert high resolution non-interlaced video graphics adapter (VGA) signals into low resolution, interlaced TV signals in formats such as National Television Standard Committee (NTSC), Phase Alternation Line (PAL) or Sequential Color with Memory (SELAM). In this context, a flicker filter refers to a digital signal sample filter to filter digital signal samples for a progressive video frame so that when the frame is displayed on an interlaced video display system, flicker is not perceived by a user. In this context, overscan compensation refers to processing digital signal samples from a non-interlaced system so that a frame visible on a non-interlaced system is visible on an interlaced system, although an interlaced system does not permit the borders of the frame to be seen.

Typically, a flicker filter comprises a vertical low-pass filter which may be used to down scale digital video signals. The term vertical in this context refers to the filtering of parallel lines of digital signal samples or pixels, such as in a video frame, for example. The quality of flicker reduction depends, at least in part, on the filter size. A three-tap flicker filter typically produces marginally acceptable quality signals. Likewise, a 4- to 5-tap flicker filter would typically produce a higher quality signal. In a conventional filter design, to implement an N-tap flicker filter, N being a positive integer greater than one, N−1 lines of digital video signals or digital signal samples are typically stored, such as in line buffers. Further, down scaling with a non-integer ratio, such as for overacan compensation, typically involves additional line buffers as well. Unfortunately, the size and number of line buffers is a cost factor when implementing a flicker filter circuit, such as in a graphics controller chip, for example. Typically, a line buffer employs large numbers of transistors or gates and this increases costs. A need, therefore, exists for a circuit configuration or technique for implementing a flicker filter circuit that reduces the number of transistors or gates employed.

SUMMARY

Briefly, in accordance with one embodiment of the invention, an integrated circuit includes: a flicker filter circuit. The flicker filter circuit has a configuration so that during filter operation two line buffers are employed to store partial sums of the filtered input digital signal samples.

Briefly, in accordance with another embodiment of the invention, an integrated circuit includes: three line buffers, three multipliers, and three adders. The buffers, multipliers and adders are coupled in a circuit configuration so as to implement a flicker filter during circuit operation.

BRIEF DESCRIPTION OF THE DRAWINGS

The subject matter regarded as the invention is particularly pointed out and distinctly claimed in the concluding portions of the specification. The invention, however, both as to organization and method of operation, together with objects, features and advantages thereof, may be best be understood by a reference to the following detailed description when read with the accompanying drawings in which:

FIG. 2 is a table providing equations for an embodiment of a flicker filter that may be implemented by the embodiment of a flicker filter circuit in accordance with the invention illustrated in FIG. 1;

FIG. 4 is a table illustrating the contents of the line buffers of FIG. 1 for a selected sequence of clock pulses or counts;

FIG. 7 is a table providing equations for two embodiments of a flicker filter that may be implemented by the embodiment of a flicker filter circuit in accordance with the invention illustrated in FIG. 1;

FIG. 8 is a table providing interpolation coefficients for embodiment of a flicker filter circuit in accordance with the invention with different amounts of vertical overscan compensation:

FIG. 10 is a table illustrating the contents of the line buffers of FIG. 9 for a selected sequence of clock pulses or counts;

DETAILED DESCRIPTION

Figure 1:
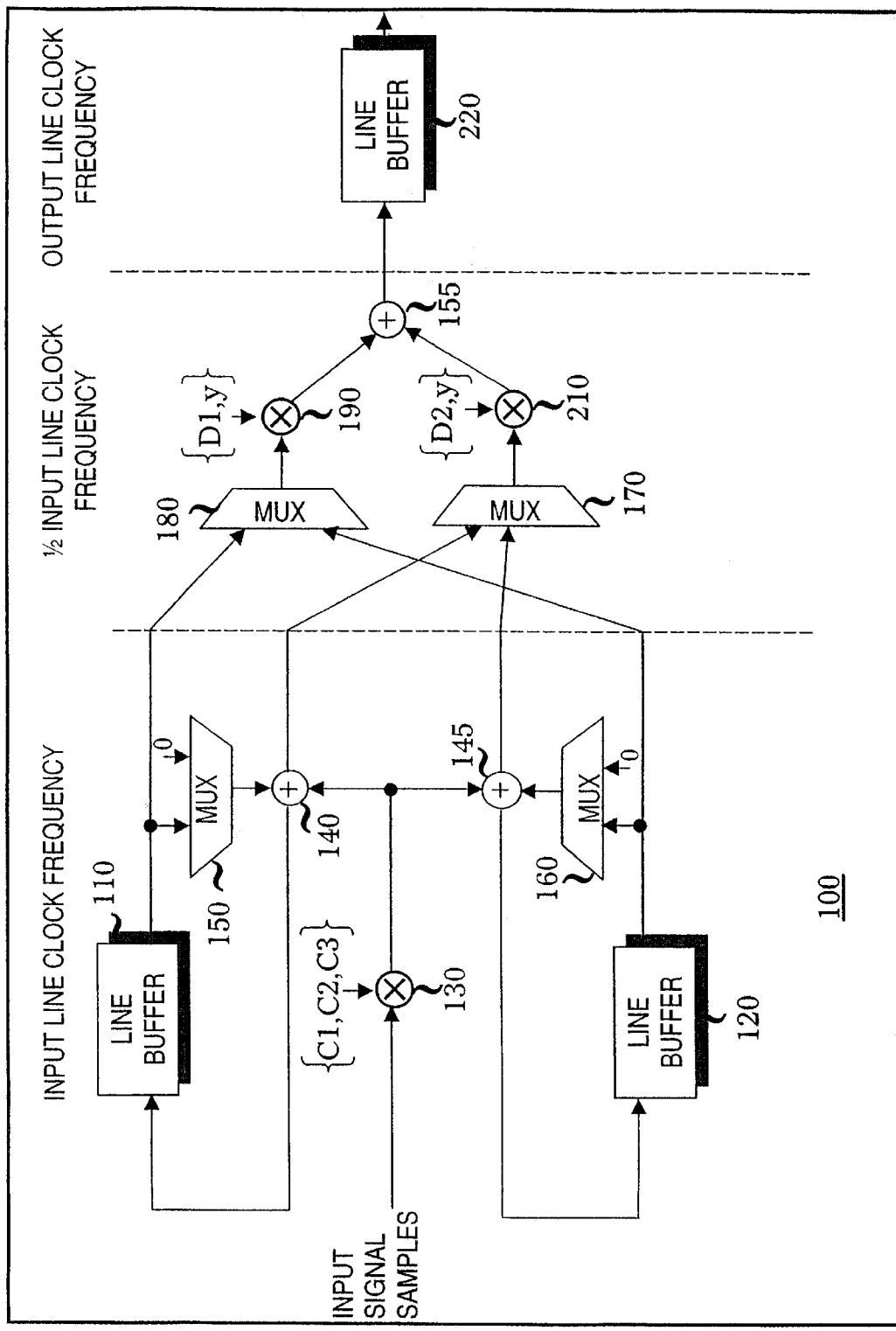
FIG. 1 is a schematic diagram illustrating an embodiment of a flicker filter circuit in accordance with the invention.

In the following detailed description, numerous specific details are set forth in order to provide a thorough understanding of the present invention. However, It will be understood by those skilled in the art that the present invention may be practiced without these specific details. In other instances, well-known methods, procedures, components, and circuits have not been described in detail so as not to obscure the present invention.

A PC graphics monitor is a progressive multi-sync device that can display at multiple resolutions, such as 640×480 pixels, 800×600 and 1024×768, for example. Its viable region may be adjusted so that the active pixels are in the viable region. The PC content Is thus designed accordingly. For example, the "Start" button of the Microsoft Windows® operating system normally resides at the lower left comer of the screen. However, it is different on a TV set. For NTSC format, there are a total of 525 scan lines per frame. Out of the 525 scan lines, there are 480 active scan lines containing video signal information. Each video frame comprises two interleaved fields: a top field and a bottom field. Thus, a field Includes a total of 262.6 scan lines with 240 active video lines. Each field is displayed at an interval of one $60^{th}$ of a second. Due to largely historical reasons, TV sets are designed to operate in an overscan mode. It used to, be very costly to maintain the linearity and correct color on the boundary of a screen. Thus, TV sets were and still are designed to hide the image boundary outside the TV tube, allowing the use of low cost electronic components. In an overscan mode, not all the active video scan lines are visible. The overscan ratio is different from vendor to vendor. Typically, it ranges from 10% to 20%. For example, when the overscan ratio is 13.3%, there are only about 200 visible lines out of the 240 active video lines in a field. Without compensating for the overscan of TV sets, PC content will not be properly shown on the screen of a TV set. For example, the "Start" button of the Microsoft Windows operating system may be outside the TV screen. Thus, overscan compensation Is desired for displaying PC graphics on a TV set.

Another issue associated with an interlaced display device is the flickering artifact. The TV signal is generated by scanning an electric beam across the screen. The ability of displaying a dynamic scene on a TV set occurs because the brightness on the screen generated by the scanning electric beam fades away quickly. Since the top field and the bottom field are scanned onto the TV screen separately, a field appears on the screen while the previous field fades away. If a frame contains high vertical frequency content, such as thin horizontal lines, the differences among the adjacent scan lines are large. The between field fading may produce high vertical frequency content flicker. Typical video programming does not contain high vertical frequency content, thus, this kind of flickering is not apparent to the human eye when displayed on a TV screen. However, high vertical frequency content is typical on a PC. These flickering artifacts make it undesirable to show PC graphics directly on a TV set. Thus, a filtering technique, referred to in this context as a flicker filter, is desired to reduce or remove the flicker artifacts.

In this context, therefore, an interlaced raster system is one where two, although it may be more, interlaced fields are used to scan out one entire frame of pixels or digital signal samples. As previously Indicated, the number of lines in a field are one half the number of lines in the frame. Each field is drawn out or scanned out consecutively, first one field than the other. As suggested, one reason for employing an interlaced system is that a TV screen that is updated at 30 frames per second would flicker, meaning that the image would begin to fade away before the next one is drawn on the screen. By using two fields, each including one-half of the information that makes up the frame, each field being drawn on the screen consecutively, the field update rate is 60 fields per second. At this update rate, the human eye blends the images together. In a non-interlaced system, the lines in the field are scanned out sequentially, one after the other. Therefore, the term field does not apply in a non-interlaced system Another term for a non-interlaced system is progressive scan.

As previously described, to implement an N-tap flicker filter, N being a positive integer greater than one, typically N−1 lines of video digital signal samples are stored. Further, down scaling with a non-integer ratio, such as for overscan compensation, typically involves additional line buffers. The size and number of line buffers introduces a cost factor for a flicker filter circuit, such as may be Implemented in a graphics controller integrated circuit (IC) or other similar integrated circuit chip.

Figure 3:
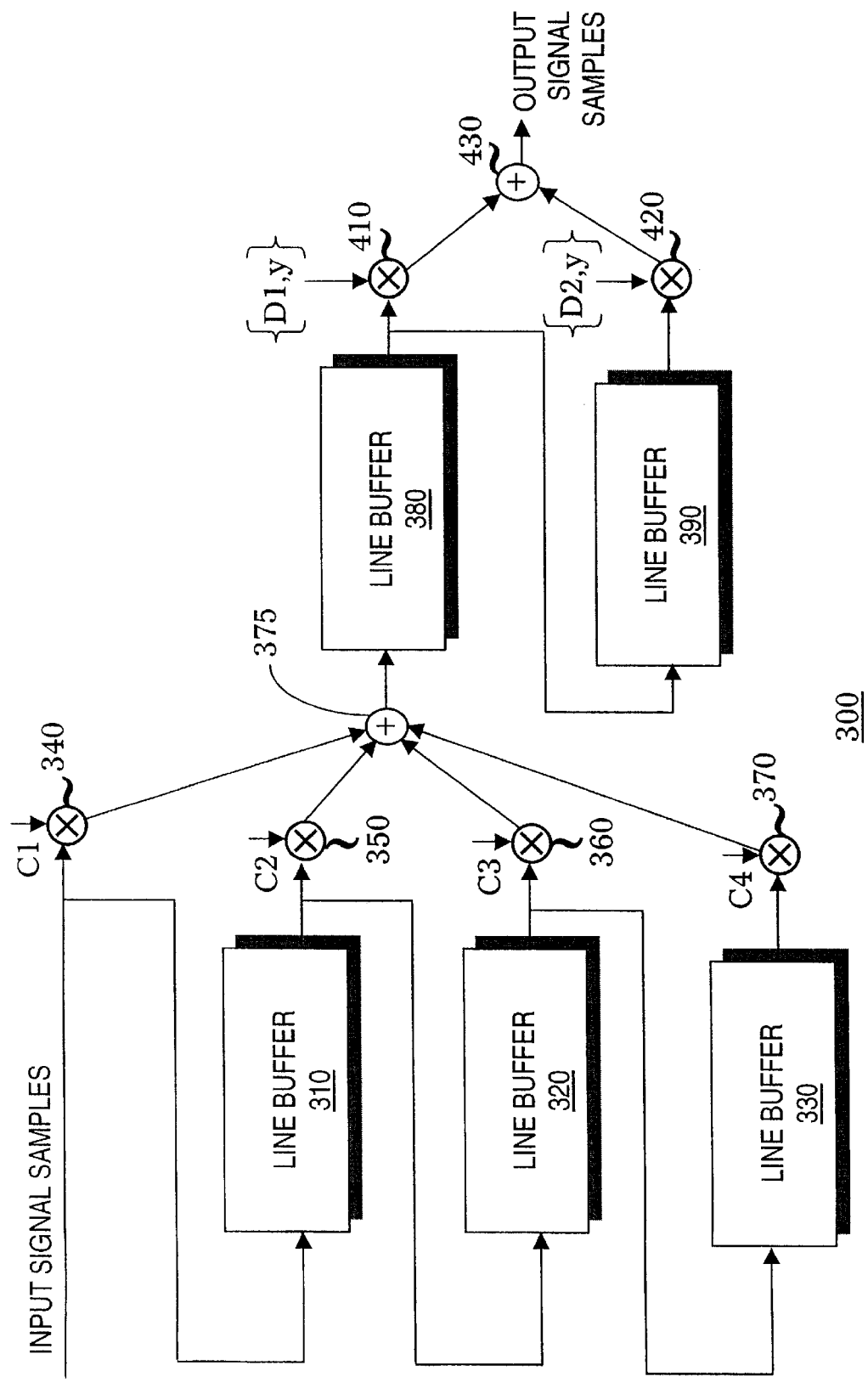
FIG. 3 is an alternative embodiment of a flicker filter circuit.

FIG. 3 is a schematic diagram of one embodiment of a five-tap flicker filter circuit including an interpolator or interpolation filter for implementing overscan compensation. In this particular embodiment, the four filter coefficients, C1, C2, C3 and C4, are fixed; however, the interpolation coefficients, D1,y, end D2,y, are time varying, depending on the line position of the line of digital signal samples to be produced.

As illustrated in FIG. 3, input digital signal samples arrive and are multiplied by coefficient C1 at multiplier 340. The output signal of multiplier 340 is provided to adder 375 along with the output signals for multipliers 360, 360 and 370. In this embodiment, line buffers 310, 320 and 330 are each the length of a line of digital signal samples for a video display. Therefore, adder 375 provides as an output signal the results of low-pass filtering four consecutive lines of a field of a video display including the current line being input. Likewise, by the same technique, a combination of line buffers 380 and 390, multipliers 410 and 420, and adder 430 produce output signals that comprise interpolated results of two lines of low-pass filtered digital signal samples. Line positioning is achieved by adjusting the interpolation coefficients, D1,y and D2,y.

FIG. 1 is a schematic diagram illustrating an embodiment of a flicker filter circuit in accordance with the present invention. This particular embodiment implements a five-tap flicker filter combining a three-tap low-pass filter having coefficients C1, C2 and C3 with a two-tap interpolation filter having coefficients D1,y and D2,y. For a symmetric low-pass filter, the coefficient C3 is the same as C1. In this particular embodiment, only two line buffers and one line (first-in, first-out) FIFO buffer are employed in comparison with five line buffers for the embodiment illustrated in FIG. 3, although the invention is not limited in scope in this respect. As in the embodiment of FIG. 3, accurate line positioning is achieved by adjusting interpolation coefficients.

This particular embodiment is illustrated as embodied on an integrated circuit, although the invention is not limited in scope in this respect. Let $h_1(n)$ and $h_2(n)$ denote the impulse response functions for the low-pass flicker filter and interpolator respectively, and $H_1(z)$ and $H_2(z)$ the corresponding Z transforms. Equations for these functions are illustrated by the table in FIG. 2. FIG. 2 also provides the Z transform for the cascade of the two filters denoted H (z).

As illustrated in FIG. 1, embodiment 100 includes two line buffers 110 and 120, three adders, 140, 145, and 165, three multipliers, 130, 190 and 210, and four multiplexers (MUX), 150, 160, 170 and 180. Embodiment 100 also includes line buffer 220, however, this line buffer is employed in this particular embodiment as a first-in, first-out (FIFO) buffer to interface with the non-interlaced system display at the appropriate line frequency. Line buffer 220 serves to accomplish the interlaced scanning out of these video display digital signal samples. For the embodiment shown in FIG. 1, the line buffers 110 and 120 are operating at the incoming line frequency, which, assuming no overacan compensation, corresponds to the rate for a non-interlaced system. Likewise, the interpolation portion of the filter operates at a line frequency which is divided to correspond with an interlaced system, again assuming no overscan compensation. A line buffer may be similarly employed for the embodiment illustrated in FIG. 3.

In this embodiment, in accordance with the present invention, the filtered output digital signal samples are stored in line buffers 110 and 120. This is in contrast with conventional approaches, such as the approach illustrated in FIG. 3, in which the input digital signal samples are stored in the line buffers. By storing the output digital signal samples, line buffers for the interpolator portion of the filter, such as 380 and 390 in FIG. 3, are not employed.

FIG. 4 is a table illustrating the content of the line buffers during the filtering process for this particular embodiment. A previously filtered digital signal sample is alternatively stored in one of the two line buffers and is sent to the interpolator along with a currently filtered digital signal sample. The table in FIG. 4 shows the updating of the two line buffers, 110 and 120, designated L1(n) and L2(n), respectively, together with the output first-in, first-out(FIFO) line buffer, designated L3(n). Index n is the sequential line clock pulse or count associated with the particular digital signal sample of the particular line of digital signal samples.

In this embodiment, the line buffers are updated in a cyclic fashion described as follows. Line buffers 110 (or L1) and 120 (or L2) have a cycle of four line counts in this embodiment. They operate alternately with an offset of two line counts. In this context, each cycle is referred to as a low-pass filter window. For each incoming line of digital signal samples, the buffer content either maintains the same signal sample value, is replaced with a filtered digital signal sample, or is added with the filtered digital signal sample. In this context, when a line buffer is in a phase of summing with the filtered digital signal sample, it is referred to as the front line buffer; meanwhile, the other line buffer is referred to as the back line buffer. For example, for line buffer 110 or L1, the content maintains the previous signal sample value at line count four, is replaced with a filtered digital signal sample at line count one, and is added with the filtered digital signal sample at line counts two and three. Line count three denotes the end of the filter window. This cycle repeats for line counts eight to eleven and so on. For line buffer 120 or L2, the cycle starts at line count two, continues through five and repeats thereafter. Line buffer 110 is the front line buffer at line counts 2, 3, 6, 7, 10, and 11 and it is the back line buffer at line counts 4, 5, 8, and 9. Also, when the last digital signal sample for the filter window arrives, it is added with the current content of the front line buffer. The results are sent to the current line portion of the interpolation filter, and multiplied by the interpolation coefficient D1,y. In this embodiment, the results are also send to the front line buffer. Examples of this, for L1, occur on the third clock pulse and, for L2, on the fifth clock pulse. At the same time, the content of the back line buffer is sent to the previous line portion of the interpolation filter, and multiplied by the interpolation coefficient D2,y. In this embodiment, examples of this, for L2, occur on the third clock pulse and, for L1, on the fifth clock pulse. Also, the line buffer holds the filtered digital signal sample for one line clock pulse. Examples of this are clock pulse four of L1 and clock pulse six of L2. Further, a filtered digital signal sample stored in the line buffer is transferred to the interpolation portion of the filter for the next clock pulse and, on the current clock pulse, replaced with the arriving digital signal sample after filtering. Examples include clock pulse five for L1 and clock pulse seven for L2.

In this particular embodiment, as previously indicated, the low-pass filter Is symmetric having coefficients C1, C2 and C1, although the invention is not restricted in scope in this respect. As FIG. 4 illustrates, the two line buffers are offset or separated in time by two clock pulses. Therefore, for this embodiment, the last filtered digital signal sample for one line buffer is the first filtered digital signal sample for the other line buffer.

As the previous discussion illustrates, the flicker filter circuit has a configuration so that during filter operation, the two line buffers are alternatively employed to store partial sums of the filtered input digital signal samples. Therefore, referring to FIG. 4 for this particular embodiment, on clock pulses one and two, line buffer 110 or L1 in this particular embodiment stores partial sums of the filtered input digital signal samples. Next, on clock pulses three and four, line buffer 110 stores filtered output signal samples. On clock pulse three, a complete output digital signal sample for this particular filter is provided to the interpolation portion. Likewise, for line buffer 120, on clock pulses three and four, partial sums are stored, while on clock pulses five and six, complete sums are stored. On clock pulse five, the sum of filtered input digital signal samples is provided to the interpolation portion.

For this particular embodiment, the filter window size for an output digital signal sample comprises five input digital signal samples. For each output digital signal sample, filtered input digital signal samples from L1 and L2 are combined. Therefore, with a one sample overlap, a five sample window occurs. The exact positioning vertically in an interlaced frame for the output digital signal sample line produced is adjusted by changing the weighing factors for the filtered lines of digital signal samples. The interpolation coefficients D1,y and D2,y have a phase determined by the overscan compensation ratio, where overscan compensation is employed, as explained in more detail hereinafter.

Figure 5:
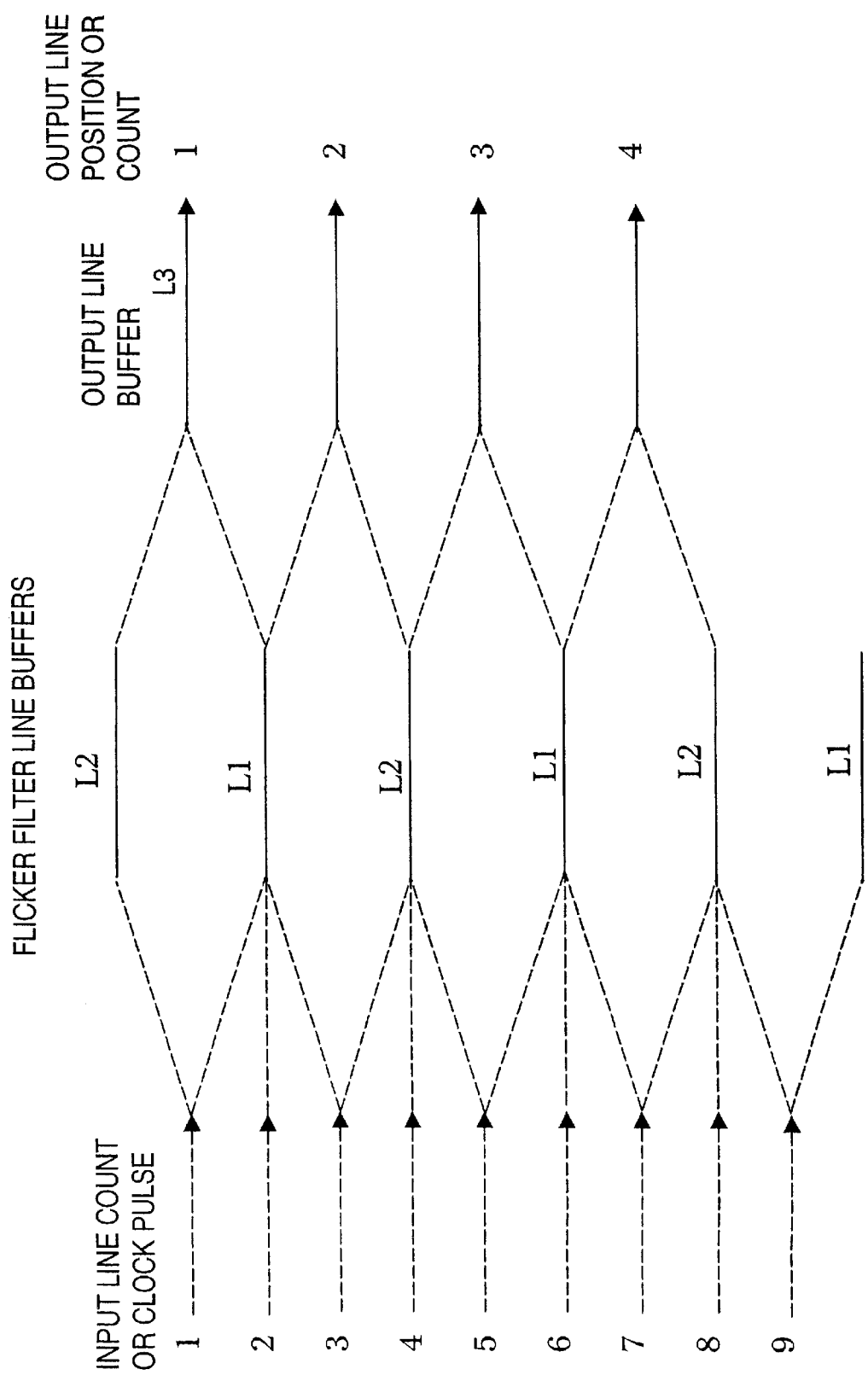
FIG. 5 is a diagram Illustrating the line position for input digital signal samples and output digital signal samples for the example shown In the table of FIG. 4.

FIG. 5 is a diagram illustrating line positions for input digital signal samples and output filtered digital signal samples for the example shown in the table of FIG. 4. From this table, the approach of alternating line buffers in this particular embodiment is Illustrated. For example, for line position 2 for the output filtered digital signal samples, the sum of input digital signal samples corresponding to input line clock pulses or counts 1, 2 and 3 are provided via line buffer 110 whereas input digital signal samples for input line clock pulses or counts 3, 4 and 6 are provided via line buffer 120. A similar result occurs for the other lines of output digital signal samples.

Figure 6:
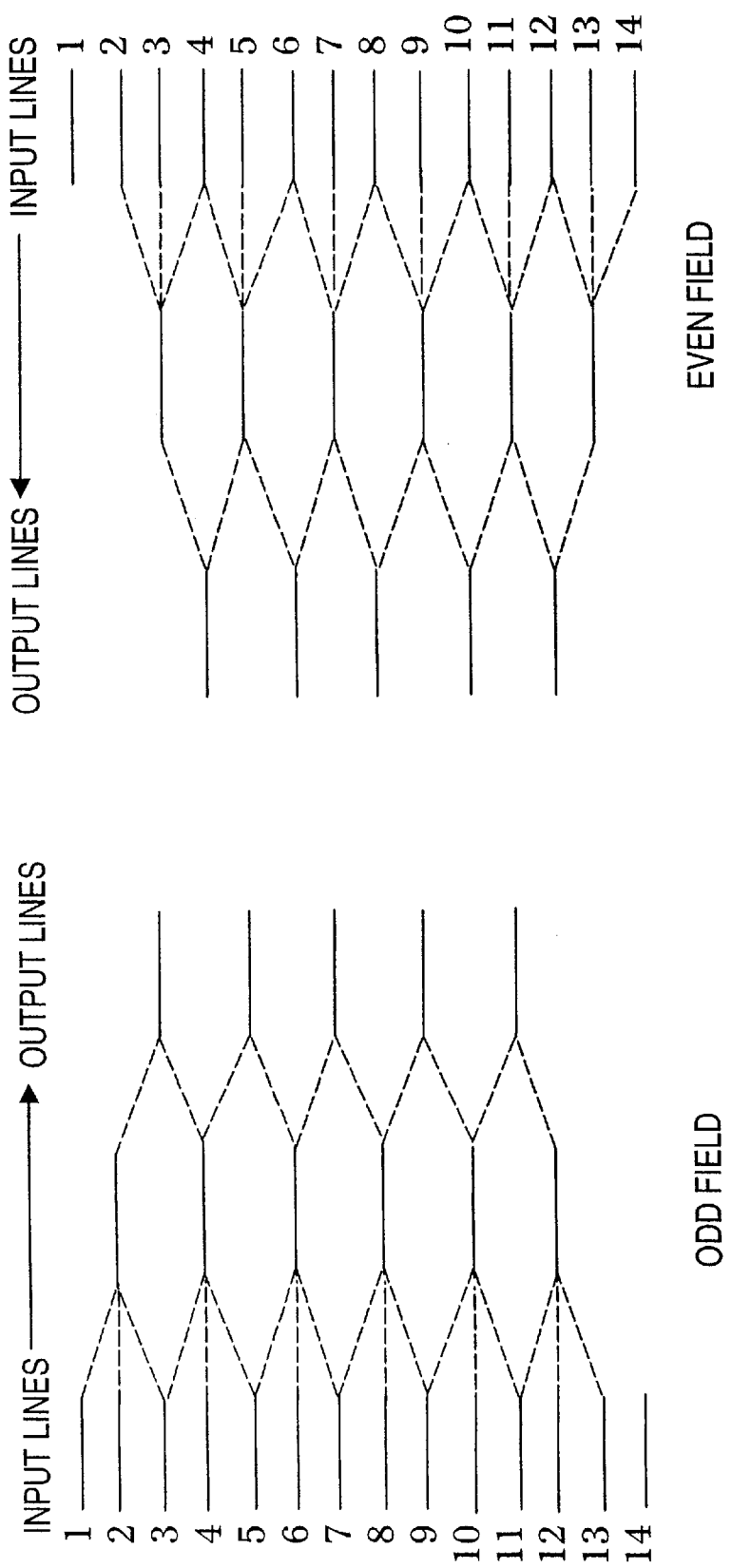
FIG. 6 is a diagram illustrating the output line position for lines of digital signal samples that may be produced by the embodiment shown in FIG. 1.

Of course, the embodiment of a flicker filter circuit in accordance with the invention, such as illustrated in FIG. 1, is employed to generate interlaced output lines of digital signal samples for both odd and even fields. Therefore, input lines of digital signal samples are offset by 1 to create a 1 line positioning shift vertically. This is illustrated by the diagram in FIG. 6. Therefore, for this particular embodiment, for an even field, flicker filtering is begun at clock pulse 2, whereas for an odd field, flicker filtering is begun at clock pulse 1.

In addition to flicker filtering, to convert from a progressive scan video frame to an interlaced video display, overscan compensation may be employed, although the invention is not restricted in scope in this respect. As previously described, overscan compensation refers to the fact that a display for television does not display the entire field or frame of digital signal samples. Therefore, some digital signal samples on the border of a video display of digital signal samples are, not visible using an interlaced television display. Therefore, when converting from a progressive scan display to an interlaced display, it is desirable to introduce what is referred to as overscan compensation to ensure that images visible on a progressive scan display are also visible on a television display. Along the horizontal direction of a frame of pixels, overscan compensation may be implemented by using a different, faster pixel frequency to drive the output line buffer, such as line buffer 220 in FIG. 1, than the pixel frequency that would be applied to drive the line buffer without overscan compensation. The pixels for an entire scan line to be displayed should be produced by the output buffer and scanned out on a TV screen within the time the visible portion of a scan line is displayed on the TV screen. For example, if approximately 10% of the digital signal samples or pixels are lost on each vertical border of the video frame then by transmitting the digital signal samples 20% faster, horizontal overscan compensation may be achieved. For example, if the display pixel frequency without horizontal overscan compensation is Fa and the horizontal overscan compensation ratio is Oh (for example, 0.2 in the previous case), then the new pixel frequency or output clock frequency, Fb, is Fb=Fa/(1−Oh). Alternatively, horizontal scaling may be accomplished by low-pass filtering the digital signal samples and down sampling.

To achieve vertical overscan compensation, a similar approach may be employed for this embodiment, although additional considerations are taken into account. An increased line frequency is applied to the line buffers receiving input digital signal samples. In a vertical direction, overscan compensation may be achieved in one embodiment by fetching the active scan lines during the duration the visible portion of the scan lines would be produced on a TV screen. This is because line buffers with limited storage are used for the intermediate filtered digital signal samples and it is desirable for the filtered result to be ready in the output buffer. Assuming, for example, an overscan compensation ratio of 13.3%, i.e., the number of visible output scan line in a field is about 200, it takes about 12.67 msec (=200/263* (1000/60)) to output these 200 lines. If the resolution of the PC is 640×480, for example, then it is desirable to process 480 scan line during a 12.67 msec period. It is desirable for the graphics frame rate to be the same as the TV display field rate, which is about 60 Hz for NTSC. In this embodiment, the overscan compensation is implemented in the filter by adjusting the increment, $\Delta$, previously described, of the interpolation coefficients {D1,y; D2,y}. When there is no overscan compensation the number of output lines equals half of the input lines as an input frame is converted to a field. Then, the increment $\Delta$ is 1. For this case, the initial phase Do of the interpolator filter, previously described, determines the effective size of the flicker filter. For example, when the initial phase is 0 and, Do is 0, the interpolator degrades to a line-dropping unit. Thus, the filter H(z) becomes a three-tap filter. When the initial phase is 0.5. and, Do is 0.5, the filter H(z) becomes a constant five-tap low-pass filter. This is illustrated by the table in FIG. 7.

The vertical overscan compensation ratio Ov, relates to the interpolator increment in this embodiment as follows: Ov=100·(1−1/$\Delta$) Thus, any vertical overscan compensation ratio may be achieved in this embodiment using this conversion. FIG. 8 provides a table of interpolated coefficients implementing different amounts of vertical overscan compensation for this embodiment.

Figure 9:
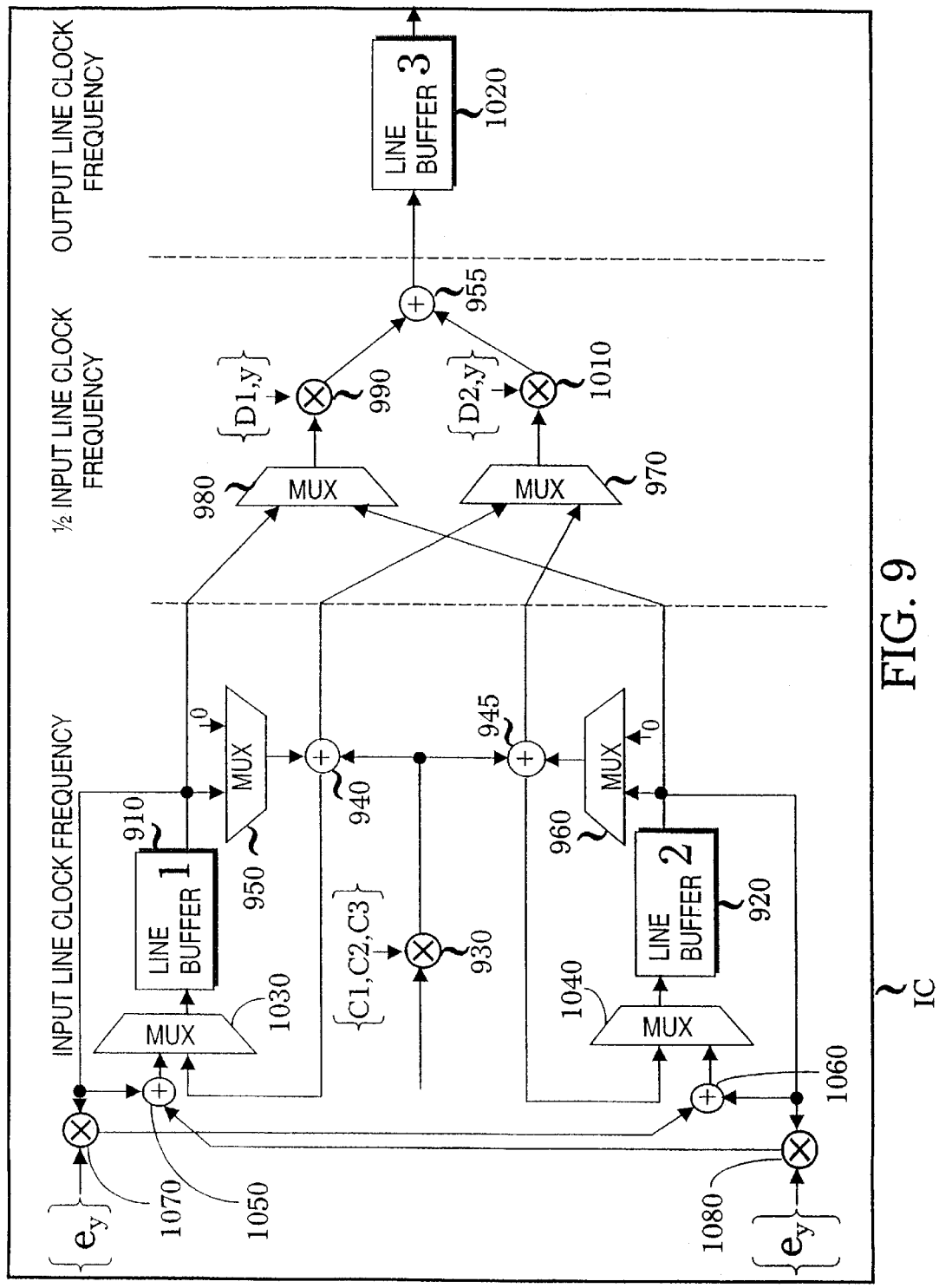
FIG. 9 is an alternative embodiment of a flicker filter circuit in accordance with the invention.
Figure 11:
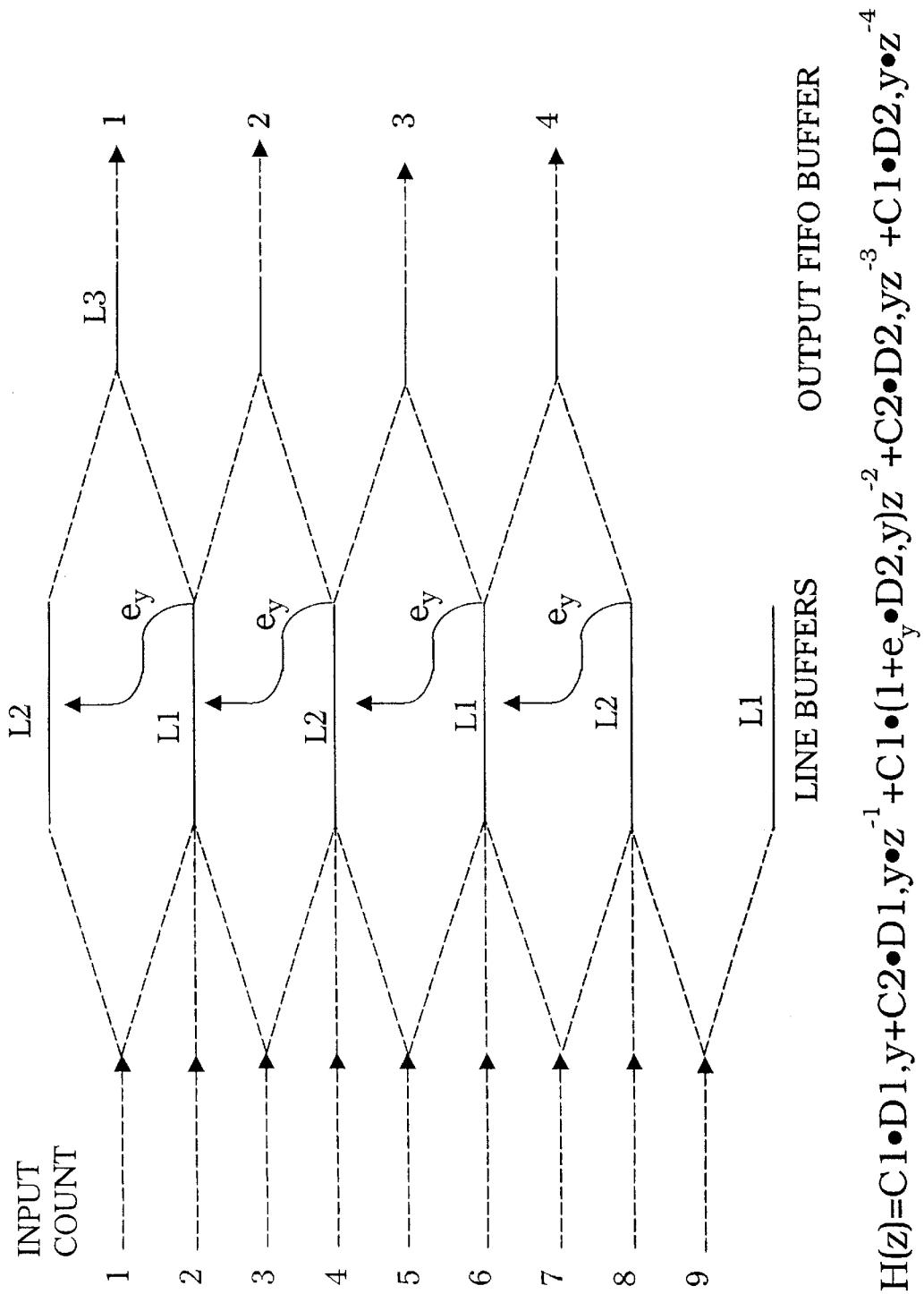
FIG. 11 is a diagram illustrating the line position for input digital signal samples and output digital signal samples for the example shown in the table of FIG. 10.

The embodiment of a flicker filter circuit, illustrated in FIG. 1, symmetrically operates on two channels before the interpolation filter. As previously described, the effective filter circuit coefficients are provided by the table of FIG. 2 by the coefficients of the cascade filter, H(z). Although the invention is not limited in scope In this respect, typically coefficient C1 is less than coefficient C2. Likewise, if C1 were chosen to be 1 and C2 were chosen to be 2, for example, then the coefficients for the cascaded filter would comprise: D1,y; 2·D1,y; 1; 2·D2,y; D2,y. Using this particular embodiment, it Is possible to provide an embodiment of a flicker filter circuit in which the filter shape is arbitrary. One such embodiment is illustrated in FIG. 9. The additional logic includes two adders, 1050 and 1060, two multipliers, 1070 and 1080, and two MUXes, 1030 and 1040. Likewise, as is illustrated, coefficients {$e_y$} are provided and employ the idle cycles of the line buffers to adjust the contents in the buffer. The timing to operate this particular embodiment is illustrated by referring to the table in FIG. 10. Referring to this table, after the contents of a line buffer is provided to the interpolator portion of the filter, the line buffer is updated by adding a weighted value of the contents of the alternate or other line buffer. For example, as in FIG. 10, the contents of line buffer 1 at count or clock pulse 4 is updated using a weighted value of the contents of the second line buffer at count or clock pulse 3. Likewise, the contents of line buffer 2 at count 6 is updated using a weighted value of the contents of line buffer 1 at count 5. These additional values, in comparison with the table in FIG. 4, are illustrated in the table of FIG. 10 by heavy or thick lettering. Of course, many alternative values for coefficients may be employed. The coefficients {$e_y$} may be constant. Alternatively, they may be adjusted according to the interpolation coefficients, D1,y and D2,y, although the invention is not limited in scope in this respect. FIG. 11 is a diagram that depicts schematically the additional operation performed with coefficients {$e_y$} in order to implement this particular embodiment. FIG. 11 also includes the filter equation for the embodiment illustrated in FIG. 9.

An embodiment of a method of implementing a flicker filter, such as may be accomplished by one of the embodiments of a flicker filter circuit, as previously described, may occur as follows. Partial sums of filtered input digital signal samples may be stored in different line buffers. These partial sums may be stored by alternatively storing partial sums of filtered input digital signals samples, such as by alternatively storing them in line buffers 110 and 120 in FIG. 1, for example. Likewise, as previously described, complete sums of filter input digital signal samples may also be stored, for example. These stored partial and/or complete sums may be employed to produce an interlaced video frame, such as by providing them at a frequency to produce horizontal overscan compensation, such as previously described. Likewise, sums of filtered input digital signal samples may be provided to produce an interlaced video frame at a frequency to produce vertical overscan compensation, such as previously described. Of course, additional embodiments are likewise possible.

While certain features of the invention have been illustrated and described herein, many modifications, substitutions, changes, and equivalents will now occur to those skilled in the art. It is, therefore, to be understood that the appended claims are intended to cover all such modifications and changes that fall within the true spirit of the invention.

What is claimed is:

1. An integrated circuit comprising: a flicker filter; said flicker filter having a configuration so that during filter operation
   at least two line buffers are employed to store partial sums of filtered input digital signal samples, and a third line buffer is employed to store digital signals samples produced during filter operation by interpolating separate sums of filtered digital signal samples.

2. The integrated circuit of claim 1, wherein said flicker filter has a configuration so that the separate sums are alternatively obtained from said two line buffers.

3. The integrated circuit of claim 2, wherein said third line buffer is coupled to be driven at a pixel frequency to produce horizontal overscan compensation.

4. The integrated circuit of claim 2, wherein said two line buffers are coupled to be driven at a line frequency to produce vertical overscan compensation.

5. The integrated circuit of claim 1, wherein said flicker filter has a configuration so that during filter operation the line buffers are alternatively employed to store partial sums of filtered input digital signal samples.

6. The integrated circuit of claim 5, wherein said flicker filter includes additional circuitry to interpolate separate sums of filtered input digital signal samples.

7. The integrated circuit of claim 6, wherein said flicker filter is adapted to interpolate the separate sums of filtered input digital signal samples with time varying interpolation coefficients.

8. The integrated circuit of claim 7, wherein said time varying interpolated coefficients have a phase.

9. The integrated circuit of claim 8, wherein said two line buffers are coupled to be driven at a line frequency to produce vertical overscan compensation; said flicker filter being adapted to implement vertical overscan compensation with said interpolation coefficients having a phase.

10. The integrated circuit of claim 5, wherein said flicker filter has a configuration to produce interleaved odd and even line positioned fields.

11. An integrated circuit comprising:
   three line buffers, three multipliers and three adders coupled so as to implement a five-tap flicker filter during circuit operation; said flicker filter further including the capability to interpolate separate sums of input digital signal samples.

12. A method of implementing a flicker filter comprising:
   storing partial sums of filtered input digital signal samples in different buffers, interpolating filtered digital signal samples from partial sums of filtered digital signal samples.

13. The method of claim 12, wherein storing partial sums comprises alternatively storing partial sums of filtered input digital signal samples.

14. The method of claim 12, and further comprising: storing complete sums of filtered input digital signal samples.

15. The method of claim 14, wherein storing complete sums comprises alternatively storing complete sums of filtered input digital signal samples.

16. The method of claim 14, and further comprising: providing separate sums to produce an interlaced video frame at a frequency to produce horizontal overscan compensation.

17. The method of claim 14, and further comprising: providing separate sums to produce an interlaced video frame at a frequency to produce vertical overscan compensation.

* * * * *

UNITED STATES PATENT AND TRADEMARK OFFICE
CERTIFICATE OF CORRECTION

PATENT NO. : 6,320,619 B1
DATED : November 20, 2001
INVENTOR(S) : Jiang

It is certified that error appears in the above-identified patent and that said Letters Patent is hereby corrected as shown below:

Column 2,
Line 62, delete "262.6", insert -- 262.5 --.

Signed and Sealed this

Seventeenth Day of September, 2002

Attest:

JAMES E. ROGAN
Attesting Officer          Director of the United States Patent and Trademark Office